United States Patent [19]

Shyu et al.

[11] Patent Number: 4,931,930
[45] Date of Patent: Jun. 5, 1990

[54] AUTOMATIC PARKING DEVICE FOR AUTOMOBILE

[75] Inventors: Jia-Ming Shyu; Ching-Wang Chuang, both of Hsin Chu Hsien, Taiwan

[73] Assignee: Industrial Technology Research Institute, Hsin Chu Hsien, Taiwan

[21] Appl. No.: 177,975

[22] Filed: Apr. 5, 1988

[51] Int. Cl.$^5$ .................. B60S 11/00; G06F 15/20
[52] U.S. Cl. ................ 364/424.01; 364/449; 340/425.5; 180/167; 180/199; 180/204
[58] Field of Search .......... 364/424.01, 449, 460; 340/51, 61; 180/167, 169, 204, 199

[56] References Cited

U.S. PATENT DOCUMENTS

| | | | |
|---|---|---|---|
| 2,736,015 | 2/1956 | Gilvarry et al. | 180/204 |
| 2,783,463 | 7/1955 | Fogiel | 340/51 |
| 3,117,642 | 1/1964 | Larinoff | 180/204 |
| 3,662,332 | 5/1972 | Zechnowitz et al. | 340/51 |
| 4,232,286 | 11/1980 | Voll | 340/51 |
| 4,528,563 | 7/1985 | Takeuchi | 180/169 |
| 4,735,274 | 4/1988 | Good et al. | 180/204 |

FOREIGN PATENT DOCUMENTS 2502773 10/1982 France .......................... 180/199

*Primary Examiner*—Felix D. Gruber
*Assistant Examiner*—V. Trans
*Attorney, Agent, or Firm*—Cushman, Darby & Cushman

[57] ABSTRACT

A device to be mounted on a car for assisting a driver to make a parallel parking or a perpendicular parking, comprises displacement-sensing devices to measure specific distance that the car moves, obstacle-sensing devices for sensing the position of obstacles around a car, and a microcomputer that can, in accordance with the driver's instructions and the data received from aforesaid displacement-sensing devices and obstacle-sensing devices, generate various signals to tell the driver to drive the car forwards, to stop the car, to turn the car left or right, or to back the car so as to park the car along a specific path, further more, the microcomputer may generate an output signal to control the steering mechanism the transmission, the accelerator, and the brake system for backing the car into a parking space automatically.

10 Claims, 8 Drawing Sheets

AUTOMATIC PARKING DEVICE FOR AUTOMOBILE

BACKGROUND OF THE INVENTION

Whenever a car is to be parked into a space with a limited width and length, such as a garage, or a space on a road side between two parked cars, the car has to be moved skillfully. Usually, a driver has to use a visual measuring method to judge if the parking space is wide and long enough, and to drive the car backwards skillfully. In case of the visual measurement being incorrect or the driving skill being poor, the parking operation encounters difficulty or the car has to be driven back and forth repeatedly, wasting a lot of time and possibly scratching the car body with other cars or objects.

SUMMARY OF THE INVENTION

This invention relates to an automatic device for parking a car in a parking space; particularly, a device used for aiding a driver to make a S-shaped parking maneuver (such as a parallel parking along road side) or a L-shaped parking maneuver (such as a perpendicular parking) in order to overcome the aforesaid difficulties in parking a car manually.

The primary object of the present invention is to provide an automatic parking device for a car moving backwards into a parking space. The device includes a sensing means to measure the relative position between the car body and the parking space. The measured data are transmitted into a microcomputer to generate a signal, which will instruct the driver, or control the operation mechanisms of the car, to drive the car timely and appropriately in a backwards direction.

Another object of the present invention is to provide obstacle-sensing means, in which distance-sensing units are used to measure the sideways distance between a car and an obstacle. Simultaneously, displacement-sensing means are also used to find out the moving distance of the car.

A further object of the present invention is to provide an automatic parking device controlled with a microcomputer which calculates the backing path and controls the driving operation in accordance with the minimum radius of a car to turn using a simple calculation method and a simple control procedure.

The present invention mainly comprises displacement-sensing means installed in the wheel-driving system for measuring the forward and the backward moving distance of a car, obstacle-sensing means which include several distance-measuring units mounted at suitable positions respectively on the car so as to measure the distances between certain parts of the car and obstacles, and a microcomputer which picks up data from the aforesaid displacement-sensing means and the obstacle-sensing means in accordance with the driver's requirement so as to confirm the relative position between the car body and the obstacles on a path that the car moves along, and to estimate if a parking position has sufficient space, and to calculate the control parameters for the car moving backwards along a path; then, the driver may be instructed by the computer, or the computer may directly control various operation mechanisms of the car, to achieve proper and timely driving. Moreover, the calculation for the path control data is based on the car moving around curves of a given radius and straight lines so as to simplify the driving operation procedures; the given radius is the minimum radius that the car can move around.

BRIEF DESCRIPTION OF THE DRAWINGS

Referring to FIG. 1, there shows the present invention comprising mainly a microcomputer 1, which includes a CPU 10, a clock pulse generator 11, a ROM 12, and a RAM 13. An operation keyboard 14 is installed at a suitable position for the driver so as to key in instruction signals into the microcomputer 1 to select a given operation condition, such as starting the engine, to park on the left side, right side, interrupt or stop. The output signals of the microcomputer 1 are to be coupled with an indicating unit 15 to instruct the driver with sound, light or dark signals; further, control signals may be used, through driving-mechanism control devices 4, to drive a car in a way desired. The microcomputer 1 will operate in accordance with the data provided by the obstacle-sensing means 2 and the displacement-sensing means 3.

The obstacle-sensing means 2 comprises several distance-measuring units, such as ultrasonic distance-measuring unit $t_1, t_2 \ldots t_n$, being mounted on suitable position respectively on a car and pointing to certain directions, for measuring the distances between obstacles and the car. The distance data will be transferred into the microcomputer 1, which will process that data in accordance with the car-displacement data sensed by the displacement-sensing means 3 so as to have microcomputer 1 figured out the related positions between obstacles and the car along the moving path of the car; then, control parameters for the moving backward path can be determined. The details of the aforesaid operation will be given later.

The displacement-sensing means 3 is used for sensing the moving distance of a car, including moving forwards, backwards, and turning. The displacement data is to be obtained by calculating the revolutions of car wheels. The displacement of a car can be obtained from the revolutions of the car wheels or the output shaft of the engine when not requiring to analyze the turning movement of a car. For the current automobile which is driven with its rear wheels, and turned with its front wheels, a revolution counter may be installed on the propelling shaft in front of the differential gear assembly for measuring the car displacement. (That is corresponding to the locus length of movement of the center point on the axis of the two rear wheels.) In the event of requiring to analyze the turning curve of a car, the rear wheels or any two wheels should be installed with revolution counters respectively so as to measure the displacement of the two wheels and to obtain the movement locus of a car. The measured value of the counter on the displacement-sensing means 3 is to be picked up periodically by the microcomputer 1, and is then calculated to obtain the movement locus of the car, and the related positions of various portions of the car at a certain moment; then, the aforesaid data will be computed together with the data obtained with the obstacle-sensing means 2. To calculate the aforesaid locus is a skill of the general geometry, for which no details are given herein.

Figure 2:
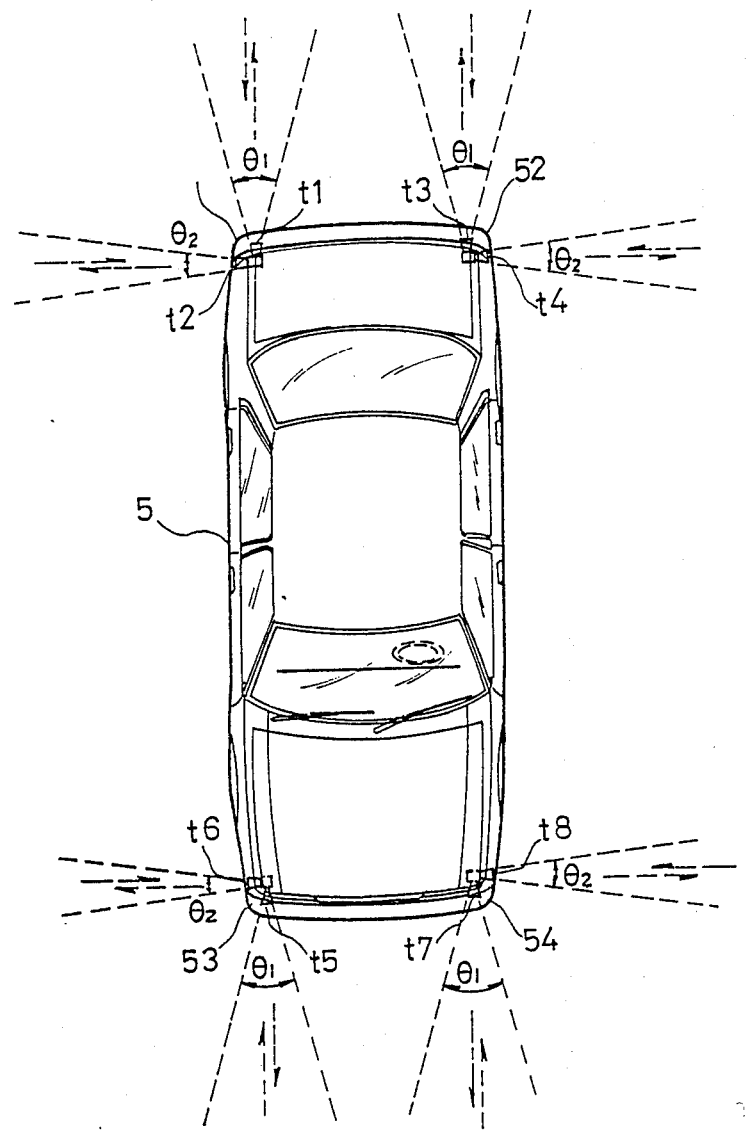
FIG. 2 is an embodiment of the obstacle-sensing means of the present invention.

FIG. 2 illustrates the distance-measuring units of the obstacle-sensing means 2 being mounted on a car; each of the four corner parts 51, 52, 53 and 54 of the automobile 5 is installed with two ultrasonic distance-measuring units to face the lengthwise and sidewise directions of the car respectively i.e. transmitting and receiving sets $t_1$, $t_2$, $t_3$, $t_4$, $t_5$, $t_6$, $t_7$, and $t_8$ are facing the front, rear, left and right directions of the car respectively, each of the sets can send out an ultrasonic signal to an obstacle, from which the reflected signal will be received by the receiving set; then, the distance between the car and the obstacle will be computed through an electronic circuit (not shown). The reason for mounting the transmitting-/receiving sets on the corners of a car is that the car corners are susceptible to hitting an obstacle during the car turning a curve, and therefore the distance sensed between the corner of a car and an obstacle can be used for preventing the car from hitting the obstacle. Of course, the other parts of the car may also be installed with other measuring units, if necessary, so as to provide more protection to the car. The ultrasonic distance-measuring unit may be made from the general and conventional technology; and the transmitting angle of the ultrasonic signal can be adjusted appropriately.

Generally, the measuring units mounted in the front and rear corners of the car are used for preventing direct collision, and should have a larger transmitting angle $\theta$. The measuring units on the left and right sides of the car are used for sensing the obstacles on both sides, and may have a smaller transmitting angle $\theta_2$. The various measuring units may not be in an operation state simultaneously, i.e., only a limited number of the measuring units are required to operate in a given situation; for instance, a car moving forwards to seek for parking position on left or right side may only have the measuring units on its left or right side operated, i.e., $t_2$, $t_6$, or $t_4$ and $t_8$. A car moving backwards to park on the right side (S-shape parking mode) may only have the measuring units $t_3$, $t_4$, $t_7$ and $t_8$ on its right side operated to prevent hitting on obstacle. A car moving backwards to park on the right side (L-shape parking mode) may only have the measuring units $t_7$ and $t_8$ on its rear-right part operated. The aforesaid operation selection may be controlled with the microcomputer 1 in accordance with instructions for different parking modes respectively.

Figure 1:
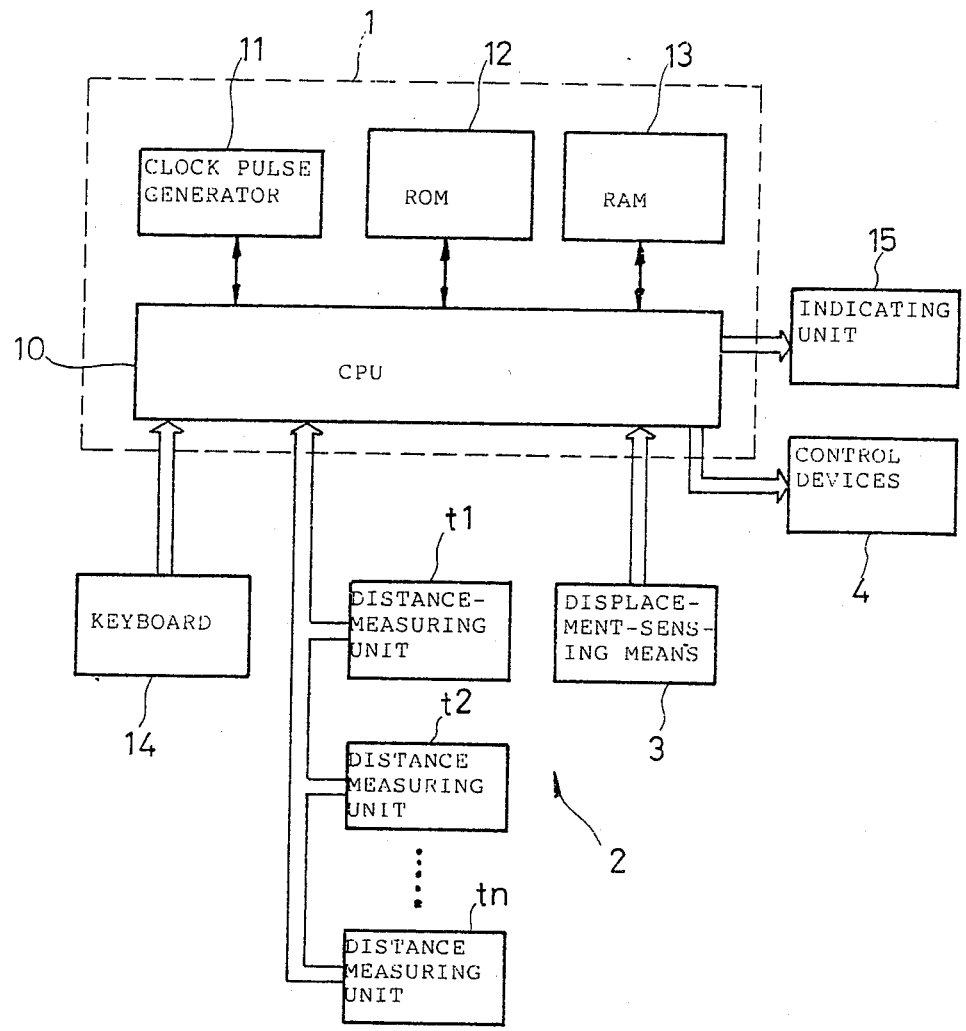
FIG. 1 is a block diagram of the major components of the present invention.
Figure 3:
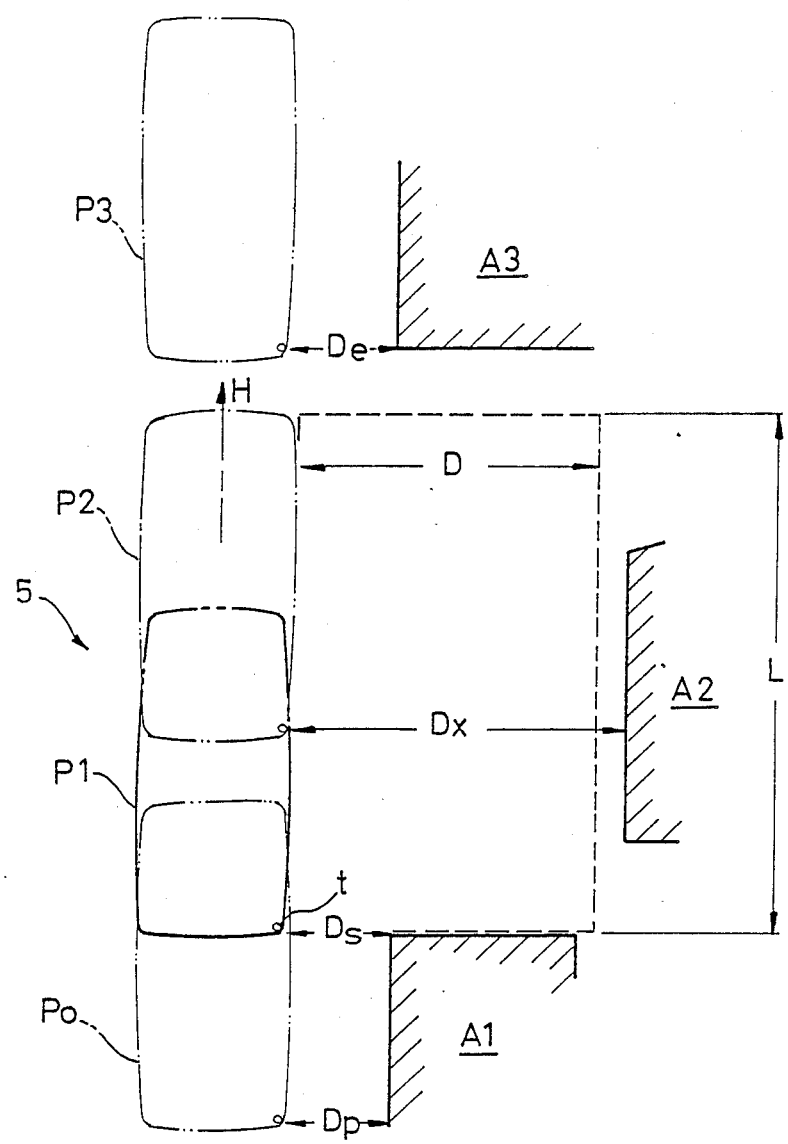
FIG. 3 is a diagram showing the operation of the obstacle-sensing means according to the present invention.

FIG. 3 illustrates how a car 5 senses positions of obstacles. When a car 5 moves in a direction indicated with arrow H, it passes the positions such as $P_o$, $P_1$, $P_2$ and $P_3$; when the car enters position $P_o$, the microcomputer 1 (as shown in FIG. 1) is instructed to sense a parking space on the right side of the car. From then on, the microcomputer 1 picks in a regular time sequence, the depth values from the distance-measuring unit t to the obstacles $A_1$, $A_2$ and $A_3$ on the right side of car (such as depth Dp when the car at position Po; depth Ds when the car at position $P_1$ $D_x$; at position $P_2$ and depth De at position $D_3$), and compares those values with a target value D. Whenever a depth value is larger than D as that after position $P_1$ shown in FIG. 3, the moving forward displacement of the car measured with the displacement-sensing means 3 FIG. 1 is then recorded and added up.

In the event of a series of depth values within a displacement target value L being continuously larger than the target value D, it means that the space on the right side of the car is large enough for parking; then, the indicating unit 15 FIG. 1 sends out a signal to indicate a parking operation to be done; otherwise, it displays signal to tell the driver that no space is available for parking, and the microcomputer continues to seek for a suitable space. The target values D and L may be determined or selected by the microcomputer 1 in accordance with predetermined parameters or a data list prepared in advance; however, different parking modes require different ways of calculating the target values, for which the details will be described later. To measure a parking space can be done by using two measuring units together on one side of the car (i.e., $t_4$ and $t_8$ as shown in FIG. 2) so as quickly measure a complete length of a parking space.

Figure 4A:
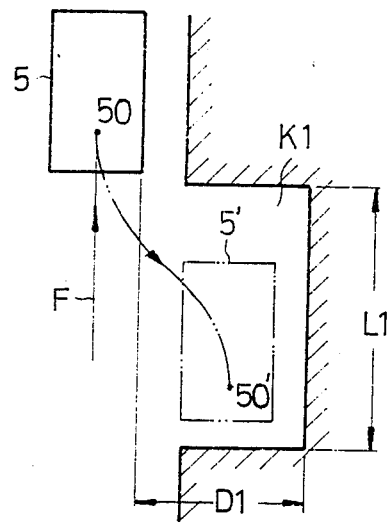
FIGS. 4A, 4B, 4C and 4D illustrate the various parking modes of an automobild.
Figure 4B:
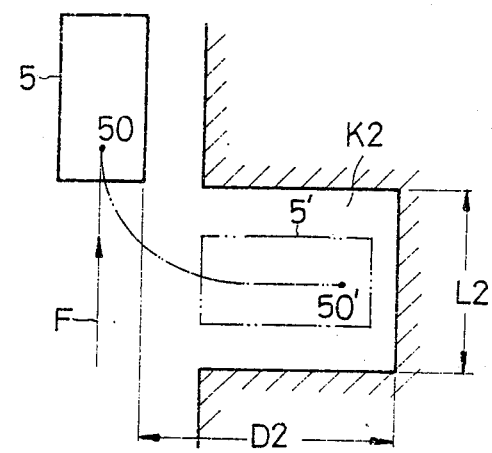
Figure 4C:
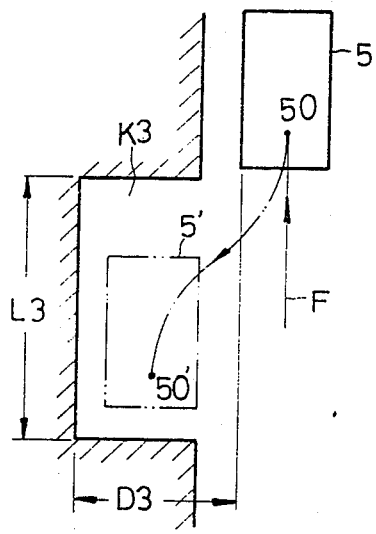
Figure 4D:
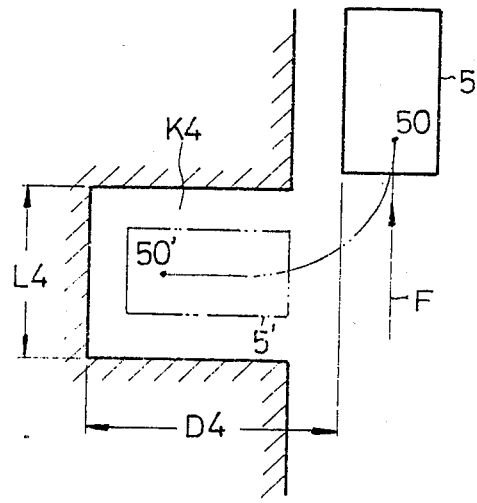

FIGS. 4A to 4D illustrates four major parking modes of a car. FIG. 4A illustrates a car parking in parallel with and on the right side of a road. FIG. 4B illustrates a right side perpendicular parking. FIG. 4C illustrates a left side parallel parking. FIG. 4D illustrates a left side perpendicular parking. In the aforesaid Figs., $K_1$, $K_2$, $K_3$ and $K_4$ indicate the parking spaces sensed respectively, having length and depth, such as $L_1$, $D_1$; $L_2$, $D_2$; $L_3$, $D_3$; $L_4$, $D_4$, which also includes sufficient clearance for the car to move around. The car 5 stops at a suitable position upon moving in arrow F to pass by the parking space and then the car moves backwards along a suitable locus to a final position 5'. The starting point 50 and the stop point 50' shown in the aforesaid Figs. indicate the center point of the shaft of the two rear wheels of the cars 5 and 5' respectively. (Generally, the front wheels of a car are used for turning, and the axis of the rear wheels is the turning center of a car, and therefore the center point of the rear-wheel shafts is suitable to describe the moving path of a car). In FIGS. 4A and 4C, the moving path the car resembles an "S" shape; in FIGS. 4B and 4D, the moving path of the car resembles an "L" shape.

The calculation and control for parking a car on the left or right side are the same, except the sensing and operation being distinguished. Therefore, only the calculation and control, procedures for right side "S" and L-shape parkings are shown in FIGS. 5 and 6.

Figure 5:
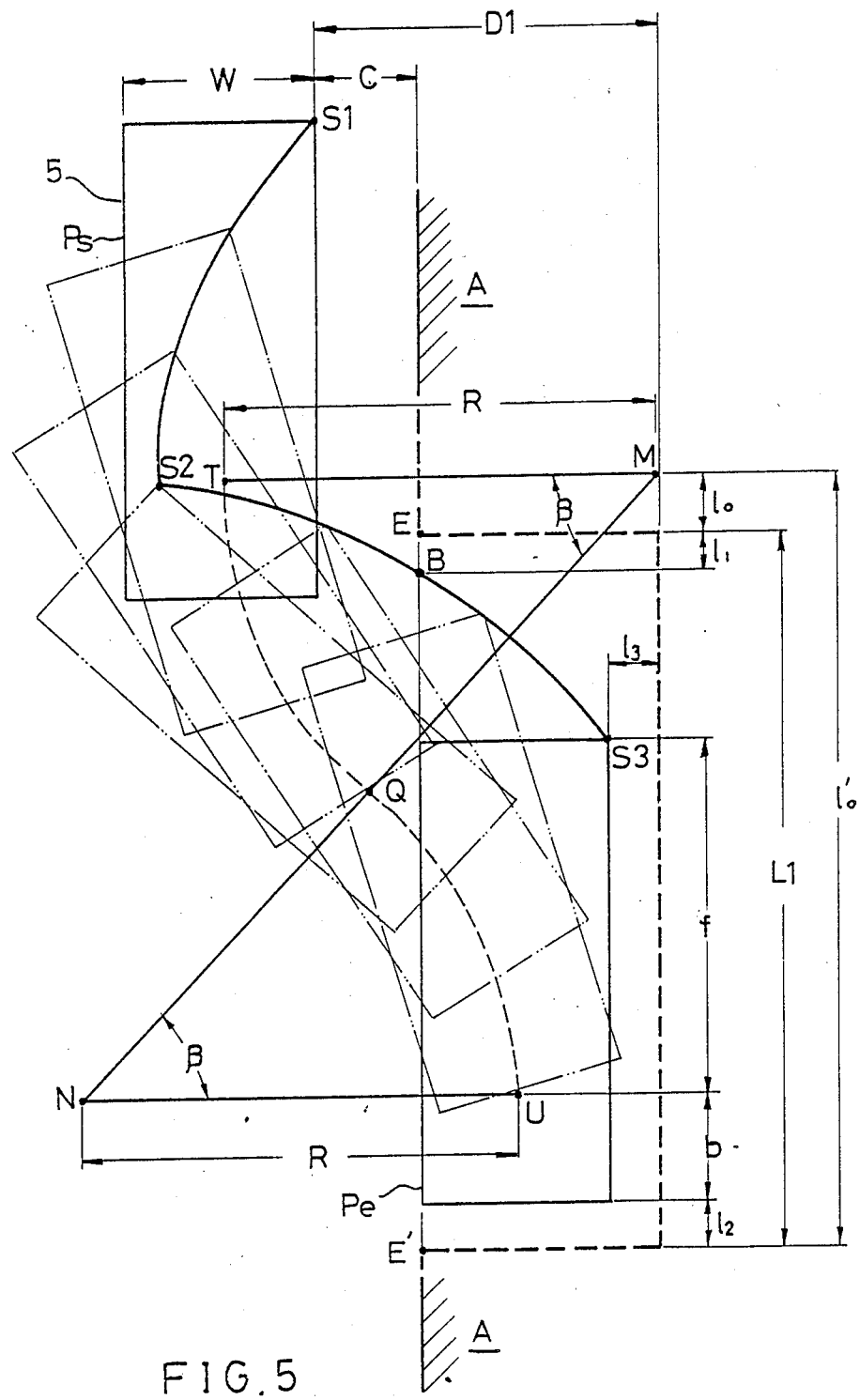
FIG. 5 illustrates an automobile moving backwards in a S"-shaped path, being calculated with a microcomputer.
Figure 6:
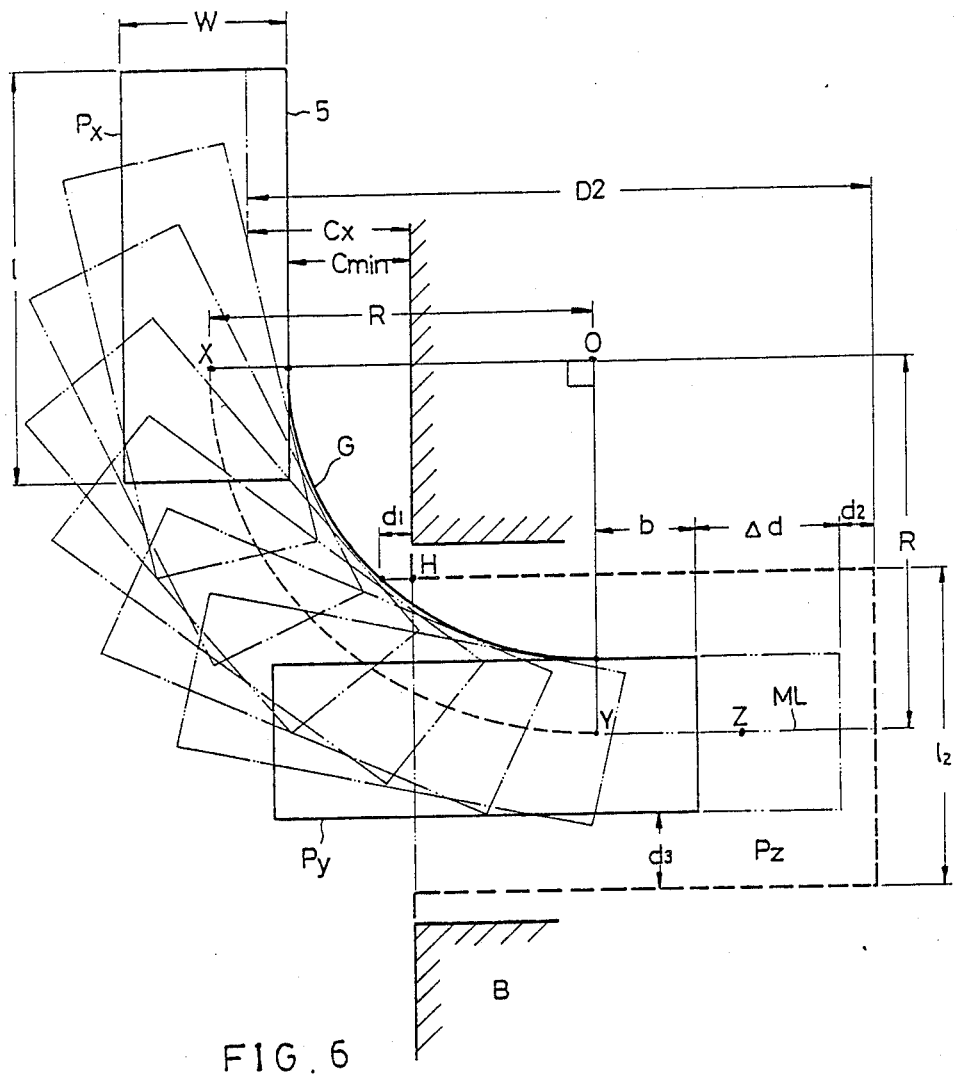
FIG. 6 illustrates an automobile moving backwards on a L-shaped path, being calculated with a microcomputer.

FIG. 5 illustrates the analysis of now the microcomputer 1 in FIG. 1 calculates and controls an automobile to parking on the right side by moving backwards. The car 5 moves from a starting position Ps backwards to a final stop position Pe; the moving path is indicated with a curve TQU, which is substantially the movement locus of the center point of the rear wheel shaft of the car. T and U fall on the center points of the starting position Ps and the stop position Pe respectively. The curve TQU consists of two cicular arcs TQ and QU, each of which has an circular angle B and a radius R. The $\theta$ radius R is the minimum turn radius of the car 5 from the center point of the rear wheel shaft thereof.

The steering wheel of car 5 should be turned to the most right side upon starting to move backwards from the starting position Ps along an arc at the angle B around a center M; then, the steering wheel of the car is turned to the leftmost side to let the car move backwards along an arc at the angle B around a center N until the car moves to the final position Pe. In that case, the calculation and control procedures will be the simplest. Before the car 5 reaches the starting position Ps, the procedures of confirming the relative position of the car with the obstacle (as shown is FIG. 3) should be done, i.e., to make sure that the space on the right side has sufficient length $L_1$ and depth $D_1$ from the obstacle A for parking the car; then, the car is stopped on the starting position Ps to be ready for moving backwards without touching the obstacle during the car moves backwards. When the car 5 moving to the final position Pe, the outer edge of the car body is alighed with that of obstacle A.

In the aforesaid Fig., the moving locus of the front-right corner of the car consists of two sections of arcs $S_1 S_2$ and $S_2 S_3$. The arc $S_2 S_3$ and the outer edge of the obstacle A are intersected at point B. Theoretically, the distance between point B and the rear edge of the car upon reaching the final position Pe would determine the minimum length of the parking space required; the minimum width of the parking space from the outer edge of the obstacle is equal to the width of the car. In practice, three clearances $l_1$, $l_2$ and $l_3$ as shown in FIG. 5 are set in addition to the minimum parking space measured so as to determine the length $L_1$ and depth $D_1$ of the required parking space. Suppose a car 5 at the starting position Ps has a gap C between its right side and the obstacle A, and has a width W, and also suppose the distances between the rear wheel shaft and the front edge and the rear edge of the car are f and b respectively, the length $L_1$ and the depth $D_1$ of the parking space required can be obtained with the formulas as follows:

$$L_1 = b + l_1 + l_2 + \sqrt{f^2 + 2R \cdot W}$$

$$D_1 = C + W + l_3$$

When determining the stop point for the car 5 moving forwards (i.e., the starting position Ps to back the car), the front corner E of the obstacle A could be in the front edge of the required parking space as shown in FIG. 5 so as to have the rear wheel shaft axis ball in front of the front corner E at a distance $l_0$, which can be obtained with: $l_0 = 2R \cdot \sin \beta - l_1 - \sqrt{f^2 + 2R \cdot W}$, or the rear corner E of the obstacle A could fall on the rear edge line of the required parking space so as to have the rear wheel shaft axis fall in front of the point E' at a distance $l_0'$ as shown in FIG. 5; the value of $l_0'$ can be obtained with:

$$l_0' = l_0 + L_1 = 2R \cdot \sin \beta + b + l_2.$$

The angle $\beta$ in the aforesaid two formulas may be obtained with:

$$\beta = \cos^{-1}[(2R - C - W)/2R.]$$

The backing path of the car is controlled by the microcomputer 1 in accordance with the value sensed by the displacement-sensing means 3 to calculate whether the car has turned and backed at the angle B predetermined.

FIG. 6 illustrates a path analysis of a car 5 making a right side perpendicular parking under the control of the microcomputer according to the present invention. The car 5 moves from the starting position Px and along an arc path XY to a position Py, and then moves backwards along a straight path YZ to the final position Pz to have the outer edge of the car and that of the obstacle B aligned. The point X is substantially the center of the rear wheel shaft of car 5 upon the car stopping at the starting position Px; the arc path XY is substantially an arc of a quarter circle with a radius R being formed by the center of the rear wheel shaft upon the car moving backwards. In other words, when the car starts to move backwards from the starting position Px, the steering wheel is to be turned to the rightmost side so as to let the car move backwards along a circle with a center O until the car being set at position Py; then, the steering wheel should be turned to its middle position before moving the car straight backwards a distance $\Delta d$ to the final position Pz. Before the car 5 enters the starting position Px, the sensing procedure for the parking space is done; i.e. when the car moves forward in parallel with the outer edge of the obstacle, the present invention senses and calculates the space and instructs the car to stop at a correct position (i.e., the starting position Px to back the car); In aforesaid procedure, the distance Cx between the car 5 and the outer edge of the obstacle B should be greater than a minimum gap Cmin so as to maintain at least a clearance distance $d_1$ between the arc G (movement locus of right side of the car) and the front corner H of the required parking space during the car moving backwards.

Suppose a car 5 has a width W, a length l, a distance b between the rear wheel shaft and the rear edge of the car, and also suppose the car is parking on the center line of the required parking space of length $L_2$ with a clearance distance $d_3$ on each of the sides and a clearance $d_2$ at the rear, the values of $L_2$, the depth $D_2$ (measured from the car body), and the minimum gap Cmin may be obtained with the following formulas:

$$L_2 = W + 2d_3;$$

$$D_2 = Cx + l + d_2;$$

$$Cx \geq Cmin = R - W/2 + d_1 - \sqrt{(R - W/2)^2 - (R - L_2/2)^2}$$

The values of $L_2$ and Cmin obtained through the aforesaid formulas enable the car to adjust the distance Cx between the car and the outer edge of the obstacle B during the car moving and measuring the parking space so as to satisfy the requirement of $Cx \geq Cmin$. For example, the microcomputer may send out an alarm signal to instruct for increasing the gap, or to operate the car directly with a control signal as to make necessary adjustments. The non-linear forward moving locus can be detected with the displacement-sensing means 3, and may be used for adjusting the value sensed by the obstacle-sensing means 2 so as to determine the relative position between the obstacle B and the car 5. When the car 5 is stopped upon arriving at the starting position Px, the distance between the rear wheel shaft axis and the mid-line ML of the parking space (i.e., the mid-line of the obstacle B space) is equal to the minimum radius R based on the center of the rear wheel shaft. When backing to position Py, the car 5 will continue to go straight back until reaching position Pz; the aforesaid displacement d of car 5 may be obtained by:

$$\Delta d = Cx + W/2 + l - R - b.$$

Figure 7:
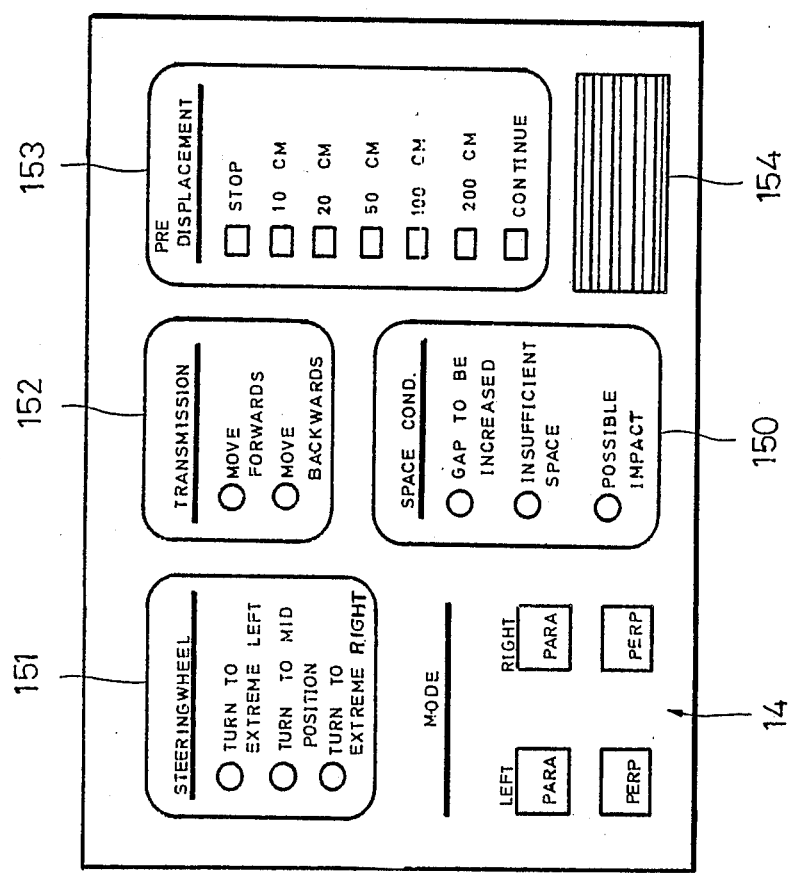
FIG. 7 is an embodiment of a panel for operation and display of the microcomputer.

FIG. 7 is an embodiment of the panel for operation and display of the microcomputer 1 according to the present invention. One part of the panel is furnished with an operation keyboard 14, which comprises four operation select push buttons, i.e., modes of left side parallel parking, left side perpendicular parking, right side parallel parking, and right side perpendicular parking. By means of the aforesaid push-buttons, the microcomputer 1 is to be instructed to operate in those certain modes; each push-button may be further furnished with a light indication upon being pushed, and the light will go out after the parking operation has been completed. The other part of the panel is provided with a plurality of pilot lamps, including a space-condition lamp assembly 150, a steering wheel pilot lamp assembly 151, a transmission pilot lamp assembly 152, a remained displacement pilot lamp assembly 153, and a speaker 154. The pilot lamp assemblies together are used for indicating to the driver so as to drive a car properly. The space-condition lamp assembly 150 includes a pilot lamp of "gap to be increased", which will be lighted up whenever the gap between the car body and the obstacle is insufficient; a pilot lamp of "insufficient space", which will be lighted up whenever a space being insufficient for parking the car; a pilot lamp of "possible impact" to warn an impact will take place upon the car moving. The steering-wheel pilot lamp assmbly 151 is mainly used during backing a car to instruct the driver to turn the steering wheel. It includes a pilot lamp of "turn to extreme left", "turn to mid-position", and "turn to extreme right", which are to be used when making various parking maneuvers, and the lamps will wink when car stops at a suitable position, and will go out upon each backing up operation being completed. The transmission pilot lamp assembly 152 includes a "move forwards" and "move backwards" lamps to instruct a car to move forwards or backwards; the lamp will wink during a transmission change, and will remain on during the car moving, and will go out upon the car completing its displacement. The remained-displacement pilot lamp assembly 153 includes series displacement indicators, e.g., "stop", 10 cm, 20 cm, 50 cm, 100 cm, 200 cm, and "continue" to instruct the car to move a given distance continuously. In fact, when a car moves forward or backward, the lamp assembly reflects the remaining distance calculated by the microcomputer for the current moving step of the car so as to instruct the driver to make necessary preparations. For example, when a car moves to sense a parking space, the lamp of "move forwards" in the transmission pilot lamp assembly 152 is lit up; at the same time, the "continue" lamp in the remained-displacement pilot lamp assembly 153 is also lit up; after finding a sufficient parking space and obtaining a starting point for backing, the carresponding remained-displacement lamp will be lit up, and such lamp will be changed continuously until the "stop" lamp is lit up; then, a suitable lamp in the steering wheel pilot lamp assembly 151 will wink; the lamp of "move backwards" also winks, and after the driver finishes the operation on the steering wheel and transmission and to start moving the car, the steering wheel pilot lamp assembly goes out, while the lamp "move backwards" remains lighted up. One lamp in the pre-displacement pilot lamp assembly 153 to indicate the displacement to be made is lit up, and the rest of the corresponding lamps will be lit up, and be put out one after another during the car moving. The lamps from "continue" to "stop" in the remained-displacement pilot lamp assembly 153 may be installed with different colors such as green, yellow, orange and red for increasing the warning result.

Figure 8:
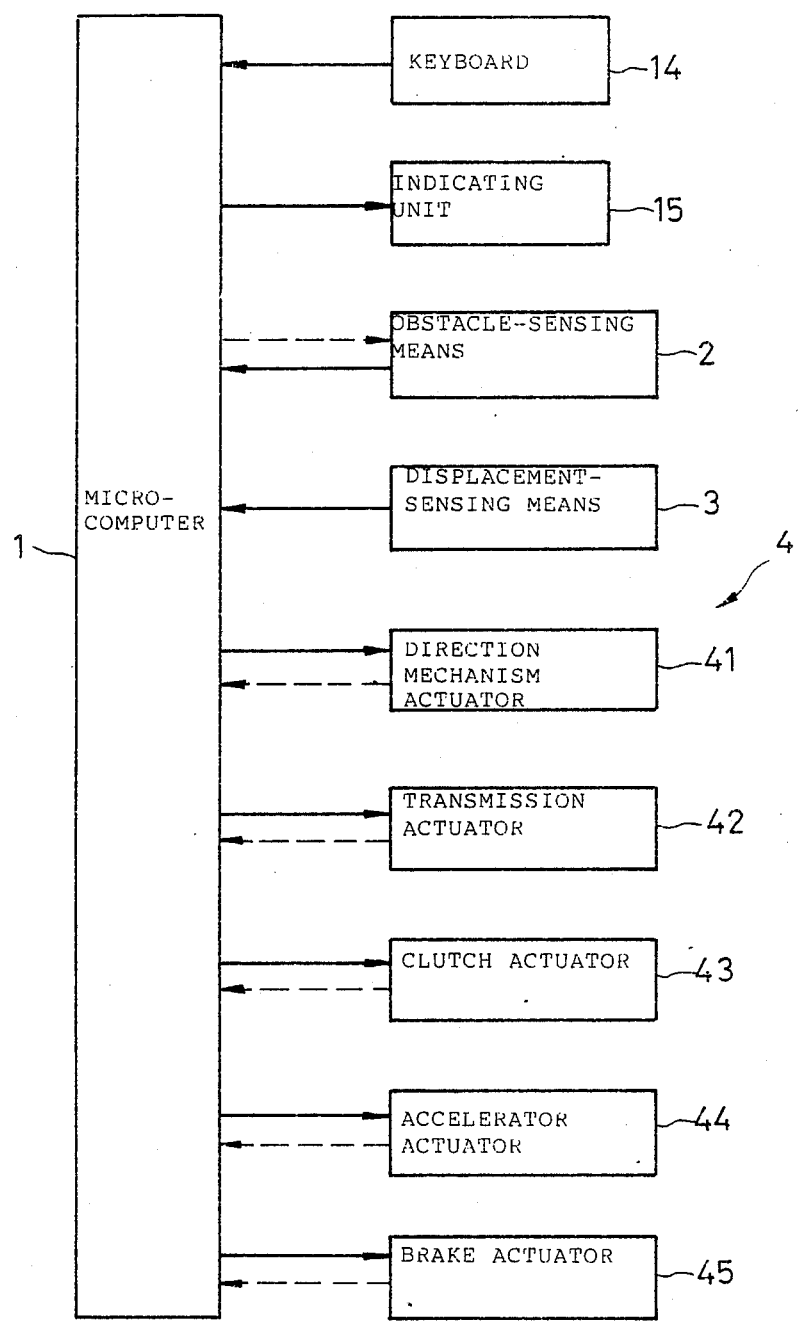
FIG. 8 is a complete block diagram of the present invention including actuating devices for operation mechanisms of a car.

The aforesaid embodiment of the indicating panel and its operation is so designed for a driver to drive his (or her) car in accordance with the instructions of the microcomputer 1. In fact, the backing path of a car according to the present invention is to be done along a straight line and around a minimum radius; therefore, the driving operation of a car may be done automatically with a simple and suitable operation means directly controlled by microcomputer 1. The whole structure of the aforesaid operation means is shown in FIG. 8 with a block diagram. After receiving the operation instructions from the operation keyboard 14 keyed in by a driver, the microcomputer 1 will start the related operation procedures. The operation keyboard 14, in addition to the selective push-buttons shown in FIG. 7, may further include several control push-buttons, e.g., "emergency stop", interrupt and "reset" so as to interrupt the operation of the driving-mechanism control devices 4 in case of being necessary. The warning signal out of the microcomputer 1 is to be displayed as sound and light signals through indicating unit 15. The warning matters are similar to those shown in FIG. 7 but for the purpose of indicating the existing driving condition of the car for driver's monitor and reference. In case of the system sensiing a possible impact to take place, the driving operation will be interrupted automatically. The structure and the functions of the obstacle-sensing means 2 and the displacement-sensing means 3 being cupled with microcomputer 1 have been mentioned above, i.e., the microcomputer 1 can selectively start cartain distance-measuring units on appropriate parts of the car to pick up the distance data, and picks up the value counted by the displacement-sensing means, so as to determine control signals to the driving-mechanism control devices 4. The control devices 4 comprise several actuators, e.g. direction mechanism actuator 41, transmission actuator 42, clutch actuator 43, accelerator actuator 44, and brake actuator 45 for controlling those driiving-mechanisms of the car.

The actuators actuate in accordance with the control signals sent out by the microcomputer 1. The position signal of the actuators are also fed back to the microcomputer 1 so as to achieve control. The direction mechanism actuator 41 can at least set the steering mechanism of the car at the extreme left, the extreme right, and the mid-position; the steering mechanism may be driven by a linear actuator (such as a hydraulic or pneumatic cylinder) or a rotary actuator (such as a motor), or an electromagnetic valve may be used for controlling the hydraulic line of a power-steering mechanism. The transmission actuator 42 and the clutch actuator 43 are operated together for controlling the motion of the car, which can at least operate the transmission at a lower speed gear to move forwards, and a reverse gear. A specially designed automatic transmission usually has an automatic clutch; in that case, the clutch actuator 43 may be omitted. The accelerator actuator 44 and the brake actuator 45 are used for controlling the speed of a car. The microcompúter 1 can oppropriately control the output of the engine with these actuators in accordance with the difference between the actual speed and the target speed of the car. When the car reduces speed or stops, though the engine has been in the lowest output state, the brake actuator 45 will be actuated to brake the car. The operation time and the related operation of the actuators are to be done in accordance with the software designed in microcomputer 1. The structures of the aforesaid actuators can be made of the conventional technques and devices, and therefore the details are not described here.

Briefly, the automatic parking device accordng to the present invention has obstacle-sensing means; coupled with displacement-sensing means to surely find out a parking space and the simplest moving path for parking a car by means of the instruction or the automatic control of a microcomputer. Therefore it is deemed that the present invention possesses an industrial value.

We claim:

1. A device for assisting a vehicle operator to park a vehicle, comprising:

displacement-sensing means for measuring the moving distance of the car and providing a signal indicative thereof;

obstacle-sensing means including several distance-measuring units mounted at suitable parts of the vehicle and pointing in certain directions for measuring distances between a body of the vehicle and obstacles along those directions, and providing signals indicative thereof;

mode selection means for allowing the vehicle operator to select a desired parking mode from left-side parallel, left-side perpendicular, right-side parallel and right-side perpendicular, and providing a signal indicative thereof; and a microcomputer for receiving said signals from said displacement-sensing means, said obstacle-sensing means and said mode selection means, for sensing a parking space at one side of the vehicle during forward movement of the vehicle, for calculating parameters needed in executing said parking mode, and for providing instruction signals to display on an indicating unit for informing the operator how to manipulate controls of the vehicle to park it, the instruction signals including signals for a steering operation, a transmission operation, remaining displacement of the vehicle, and parking space conditions.

2. A device as in claim 1, wherein said indicating signals from said microcomputer include signals for steering operation, transmission operation, remained displacement of the vehicle, and space conditions.

3. A device as in claim 1, wherein said parameters for executing a parallel parking mode comprise:

a length $L_1$ and a depth $D_1$ of a required parking space;

a first position where the vehicle should stop from moving forward to start moving backward with a first direction maximum turning;

a second position where the vehicle should continue moving backward with a second direction maximum turning; and a third position where the vehicle finishes parking;

said first, second and third positions represented by a center point of a rear wheel shaft of the vehicle forming a S-shaped path by an arc at a suitable angle $\beta$ and with a radius R and an opposite arc at the same angle $\beta$ and same radius R;

supposing said first position being indicated with a center point of said rear wheel shaft, and said center point having a distance $l_0$ from a front edge of said length $L_1$ of said parking space, and when the vehicle reaches said third point, the body of the vehicle and an outer edge of the obstacle align next to each other, then said arc angle $\beta$, length $L_1$, depth $D_1$ and distance $l_0$ can be obtained with the following formulas:

$$\beta = \cos^{-1}\{(2R - C - W)/2R\};$$

$$L_1 = b + l_1 + l_2 + \sqrt{f^2 - 2R \cdot W} \;;$$

$$D_1 = C + W + l_3;$$

$$l_0 = 2R \cdot \sin \beta - l_1 - \sqrt{f^2 + 2R \cdot W} \;;$$

in which:

C = the distance between the body of the vehicle and the outer edge of an obstacle on the parking side when the vehicle is at said first position;

W = the width of the vehicle;

f = the distance between the rear wheel shaft axis and the front edge of the vehicle;

b = the distance between the rear wheel shaft axis and the rear edge of the vehicle;

$l_1$ = clearance distance in the front of the parking space when the vehicle is at said third position;

$l_2$ = clearance distance in the rear of the parking space;

$l_3$ = clearance distance on one side of the parking space;

R minimum turn radius on said center point of the rear wheel shaft.

4. A device as in claim 1, wherein said parameters for executing a perpendicular parking mode comprise:

a length $L_2$ and depth $D_2$ of a required parking space;

a first position where the vehicle should stop moving forward and start moving backward with certain direction maximum turning;

a second position where the vehicle should continue moving straight back; and a third position where the vehicle finishes parking;

said first, second and third positions represented by a center point of a rear wheel shaft of the vehicle forming a L-shaped path including a quarter arc of a circle around a radius R and a line $\Delta d$ extending tangentially on the end point of said arc;

supposing said first position being indicated with said center point of the rear wheel shaft, and having a distance equal to the aforesaid radius R from a center line of said required parking space, a space between a body of the vehicle and the outer edge of an obstacle being at least equal to a minimum gap Cmin, and when the vehicle reaches said third position, the outer edge of the body and the outer edge of said obstacle being aligned next to each other, then said line d, length $L_2$, width $D_2$ and minimum gap Cmin can be obtained with the following formulas:

$$\Delta d = Cx + W/2 + l - R - b;$$

$$L_2 = W + 2 \cdot d_3;$$

$$D_2 = Cx + l + d_2;$$

-continued $$C_{min} = R - W/2 + d_1 - \sqrt{(R - W/2)^2 - (R - L_2/2)^2} \ ;$$

Cx=distance between the body and the outer edge of an obstacle on the parking side (should be Cmin);
W=width of the vehicle;
l=length of the vehicle;
b=distance between the rear wheel shaft of the vehicle and the rear edge thereof;
$d_1$=clearance distance on the outer edge of said parking space;
$d_2$=clearance distance between the bottom side of said parking space;
$d_3$=clearance distances maintained on the both sides of the vehicle from both sides of parking space;
R=minimum turn radius of the vehicle on said center point of the rear wheel shaft.

5. A device for automatically parking a vehicle, comprising:
displacement-sensing means for measuring a moving distance of the vehicle and providing a signal indicative thereof;
obstacle-sensing means including several distance-measuring units mounted at suitable parts of the vehicle and pointing in certain directions for measuring distances between a body of the vehicle and obstacles along those directions, and providing signals indicative thereof;
mode selection means for allowing an vehicle operator to select a desired parking mode from left-side parallel, left-side perpendicular, right-side parallel and right-side perpendicular, and providing a signal indicative therreof; and
a microcomputer for receiving said signals from said displacement-sensing means, obstacle-sensing means, and mode selection means, and for sensing a parking space at one side of the vehicle during forward movement of the vehicle, and for calculating parameters needed in executing the selected parking mode, and providing control signals to control driving mechanisms of the vehicle with control devices so as to achieve desired control of the vehicle, said control signals including signals for controlling actuators of a direction mechanism, a clutch, a transmission, an accelerator and a brake.

6. A device as in claim 5, wherein said control signals from said microcomputer include the signals for controlling actuators of direction mechanism transmission, clutch, accelerator, and brake.

7. A device as in claim 5, wherein said parameters for executing a parallel parking mode comprise:
a length $L_1$ and a depth $D_1$ of a required parking space;
a first position where the vehicle should stop from moving forward to start moving backward with a first direction maximum turning;
a second position where the vehicle should continue moving backward with a second direction maximum turning; and
a third position where the vehicle finishes parking;
said first, second and third positions represented by a center point of a rear wheel shaft of the vehicle forming a S-shaped path by an arc at a suitable angle $\beta$ and with a radius R and an opposite arc at the same angle $\beta$ and same radius R;
supposing said first position being indicated with a center point of said rear wheel shaft, and said center point having a distance $l_0$ from a front edge of said length $L_1$ of said parking space, and when the vehicle reaches said third point, the body of the vehicle and an outer edge of the obstacle align next to each other, then said arc angle $\beta$, length $L_1$, depth $D_1$ and distance $l_0$ can be obtained with the following formulas:

$$\beta = \cos^{-1}\{(2R - C - W)/2R\};$$

$$L_1 = b + l_1 + l_2 + \sqrt{f^2 - 2R \cdot W} \ ;$$

$$D_1 = C + W + l_3;$$

$$l_0 = 2R \cdot \sin \beta - l_1 - \sqrt{f^2 + 2R \cdot W} \ ;$$

in which:
C=the distance between the body of the vehicle and the outer edge of an obstacle on the parking side when the vehicle is at said first position;
W=the width of the vehicle;
f=the distance between the rear wheel shaft axis and the front edge of the vehicle;
b=the distance between the rear wheel shaft axis and the rear edge of the vehicle;
$l_1$=clearance distance in the front of the parking space when the vehicle is at said third position;
$l_2$=clearance distance in the rear of the parking space;
$l_3$=clearance distance on one side of the parking space;
R minimum turn radius on said center point of the rear wheel shaft.

8. A device as in claim 5, wherein said parameters for executing a perpendicular parking mode comprise:
a length $L_2$ and depth $D_2$ of a required parking space;
a first position where the vehicle should stop moving forward and start moving backward with certain direction maximum turning;
a second position where the vehicle should continue moving straight back; and
a third position where the vehicle finishes parking;
said first, second and third positions represented by a center point of a rear wheel shaft of the vehicle forming a L-shaped path including a quarter arc of a circle around a radius R and a line $\Delta d$ extending tangentially on the end point of said arc;
supposing said first position being indicated with said center point of the rear wheel shaft, and having a distance equal to the aforesaid radius R from a center line of said required parking space, a space between a body of the vehicle and the outer edge of an obstacle being at least equal to a minimum gap Cmin, and when the vehicle reaches said third position, the outer edge of the body and the outer edge of said obstacle being aligned next to each other, then said line d, length $L_2$, width $D_2$ and minimum gap Cmin can be obtained with the following formulas:

$$\Delta d = Cx + W/2 + l - R - b;$$

$$L_2 = W + 2 \cdot d_3;$$

$$D_2 = Cx + l + d_2;$$

$$C_{min} = R - W/2 + d_1 - \sqrt{(R - W/2)^2 - (R - L_2/2)^2} \ ;$$

Cx = distance between the body and the outer edge of an obstacle on the parking side (should be Cmin);
W = width of the vehicle;
l = length of the vehicle;
b = distance between the rear wheel shaft of the vehicle and the rear edge thereof;
$d_2$ = clearance distance on the outer edge of said parking space;
$d_2$ = clearance distance between the bottom side of said parking space;
$d_3$ = clearance distances maintained on the both sides of the vehicle from both sides of parking space;
R = minimum turn radius of the vehicle on said center point of the rear wheel shaft.

9. A device for assisting a vehicle operator to park a vehicle, said device comprising:
displacement-sensing means for measuring the moving distance of the vehicle and providing a signal indicative thereof;
obstacle-sensing means including several distance-measuring units mounted at suitable parts of the vehicle and pointing in certain directions for measuring distances between a body of the vehicle and obstacles along those directions, and providing signals indicative thereof; and
a microcomputer for receiving said signals from said displacement-sensing means and said obstacle-sensing means, and for sensing a parking space at one side of the vehicle during forward movement of the vehicle, and for calculating data to control the vehicle moving backward along a suitable path, said data including a stop point where the vehicle stops moving forward and begins moving backward, said microcomputer sending out signals to display on an indicating unit for informing the operator how to manipulate controls of the vehicle to park it;
wherein the backing path of the vehicle begins from said stop point to form a S-shaped path until the vehicle reaches a final point where it is parked completely in a parallel position, said S-shaped path being formed with an arc at a suitable angle $\beta$ and with a radius R and an opposite arc at the same said angle and same said radius R, a parking space required by the vehicle is determined with a length $L_1$ and a depth $D_1$, and said stop point of the vehicle in moving forwards is determined in the length direction of the required parking space, supposing said stop point being indicated with a center point of a rear wheel shaft and said central point having a distance $l_0$ from a front edge of said parking space, and when the vehicle reaches said final point, the body and an outer edge of the obstacle align next to each other, then said arc angle $\beta$, said length $L_1$, said depth $D_1$ and said distance $l_0$ can be obtained with the following formulas:

$$\beta = \cos^{-1}(2R - C - W)/2R;$$

$$L_1 = b + l_1 + l_2 + \sqrt{f^2 - 2R \cdot W} \ ;$$

$$D_1 = C + W + l_3;$$

$$l_0 = 2R \cdot \sin\beta - l_1 - \sqrt{f^2 + 2R \cdot W} \ , \text{ and in which:}$$

C = the distance between the body and the outer edge of the obstacle on the parking side (when the vehicle is at said stop point);
W = width of the vehicle;
f = distance between the rear wheel shaft axis and the front edge of the vehicle;
b = the distance between the rear wheel shaft axis and the rear edge of the vehicle;
$l_1$ = clearance distance in the front of the parking space (when the vehicle is at said final point);
$l_2$ = clearance distance in the rear of the parking space;
$l_3$ = clearance distance on one side of the parking space;
R the minimum turn radius on the center point of the rear wheel shaft.

10. A device for assisting a vehicle operator to park a vehicle, said device comprising:
displacement-sensing means for measuring the moving distance of the car and providing a signal indicative thereof;
obstacle-sensing means including several distance-measuring units mounted at suitable parts of the vehicle and pointing in certain directions for measuring distances between a body of the vehicle and obstacles along those directions, and providing signals indicative thereof; and
a microcomputer for receiving said signals from said displacement-sensing means and said obstacle-sensing means, and for sensing a parking space at one side of the vehicle during forward movement of the vehicle, and for calculating data to control the vehicle moving backward along a suitable path, said data including a stop point where the vehicle stops moving forward and commences backward movement, said microcomputer sending out signals to display on an indicating unit for informing the operator how to manipulate controls of the vehicle to park it;
wherein the backing path of the vehicle during a perpendicular parking maneuver is from said stop point to a final point and forms an L-shaped path that includes a quarter arc of a circle and a line $\Delta d$ extending tangentially on the end of said arc, the required parking space being expressed with its length $L_2$ and width $D_2$, said stop point being determined on a point along the center line of the vehicle and at least a specific distance between said stop point and the outer edge of an obstacle being maintained, supposing said stop point being indicated with the center point of the rear wheel shaft, and having a distance equal to the aforesaid radius R from the center line of said required parking space, a space between a body of the vehicle and the outer edge of the obstacle being at least equal to a minimum gap, Cmin, and when the vehicle reaches said final point, the outer edge of the body and the outer edge of said obstacle being aligned, then said line $\Delta d$, said length $L_2$, said width $D_2$ and said minimum gap Cmin can be obtained with the following formulas:

$$\Delta d = Cx + W/2 + l - R - b;$$

$$L_2 = W + 2 \cdot d_3;$$

$$D_2 = Cx + l + d_2;$$

$$C_{min} = R - W/2 + d_1 - \sqrt{(R - W/2)^2 - (R - L_2/2)^2};$$

$Cx$ = distance between the body and the outer edge of an obstacle on the parking side (should be minimal);

$W$ = width of vehicle;

$l$ = length of vehicle;

$b$ = distance between the rear wheel shaft axis of the vehicle and the rear edge thereof;

$d_1$ = clearance distance on the outer edge of the required parking space;

$d_2$ = clearance distance between the bottom side of said parking space and the rear edge of the parked vehicle;

$d_3$ = clearance distances maintained on the both sides of the vehicle from both sides of the required parking space;

$R$ the minimum turn radius on the center point of the rear wheel shaft.

* * * * *